United States Patent
Sugimoto

(10) Patent No.: US 10,840,495 B2
(45) Date of Patent: Nov. 17, 2020

(54) FUNCTIONAL LAYER FOR NON-AQUEOUS SECONDARY BATTERY AND NON-AQUEOUS SECONDARY BATTERY

(71) Applicant: ZEON CORPORATION, Chiyoda-ku (JP)

(72) Inventor: Takumi Sugimoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/489,466

(22) PCT Filed: Mar. 7, 2018

(86) PCT No.: PCT/JP2018/008840
§ 371 (c)(1),
(2) Date: Aug. 28, 2019

(87) PCT Pub. No.: WO2018/168612
PCT Pub. Date: Sep. 20, 2018

(65) Prior Publication Data
US 2020/0052271 A1 Feb. 13, 2020

(30) Foreign Application Priority Data
Mar. 17, 2017 (JP) .................................. 2017-053545

(51) Int. Cl.
*H01M 2/16* (2006.01)
*C08L 77/10* (2006.01)
*C08L 33/12* (2006.01)

(52) U.S. Cl.
CPC ............ *H01M 2/168* (2013.01); *C08L 33/12* (2013.01); *C08L 77/10* (2013.01); *C08L 2201/08* (2013.01); *C08L 2207/53* (2013.01)

(58) Field of Classification Search
CPC .............................. H01M 2/168; C08L 77/10
See application file for complete search history.

(56) References Cited

U.S. PATENT DOCUMENTS

| 8,362,146 B2* | 1/2013 | Eipper .................... C08L 69/00 525/67 |
| 9,941,497 B2* | 4/2018 | Toyoda .................. H01M 2/145 |
| 2002/0110739 A1* | 8/2002 | McEwen ........... H01M 10/0525 429/324 |
| 2010/0159318 A1 | 6/2010 | Sato et al. |
| 2012/0225344 A1 | 9/2012 | Hong et al. |

FOREIGN PATENT DOCUMENTS

| CN | 105633326 A | * | 6/2016 |
| JP | 63141207 A | * | 6/1988 |
| JP | 2008311221 A | | 12/2008 |
| JP | 2009123483 A | | 6/2009 |
| JP | 2009123484 A | | 6/2009 |
| JP | 5072242 B2 | | 11/2012 |
| JP | 2013511124 A | | 3/2013 |
| JP | 2013145763 A | | 7/2013 |
| JP | 2016025058 A | | 2/2016 |

OTHER PUBLICATIONS

Machine translation of CN 105633326 A, published Jun. 1, 2016. (Year: 2016).*
Machine translation of JP 63-141207 A, published Sep. 16, 1988. (Year: 1988).*
Sep. 17, 2019, International Preliminary Report on Patentability issued in the International Patent Application No. PCT/JP2018/008840.
Jun. 5, 2018, International Search Report issued in the International Patent Application No. PCT/JP2018/008840.

* cited by examiner

*Primary Examiner* — Vickey Nerangis
(74) *Attorney, Agent, or Firm* — Kenja IP Law PC

(57) ABSTRACT

Provided is a functional layer for a non-aqueous secondary battery having reduced water content and excellent heat resistance and adhesiveness. The functional layer for a non-aqueous secondary battery contains a heat resistant resin and an acidic group-containing polymer. The percentage content of chlorine atoms in the functional layer for a non-aqueous secondary battery as measured by combustion ion chromatography is not less than 0.001 mass % and not more than 2.000 mass %.

4 Claims, No Drawings

FUNCTIONAL LAYER FOR NON-AQUEOUS SECONDARY BATTERY AND NON-AQUEOUS SECONDARY BATTERY

TECHNICAL FIELD

The present disclosure relates to a functional layer for a non-aqueous secondary battery and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A non-aqueous secondary battery generally includes battery components such as a positive electrode, a negative electrode, and a separator that isolates the positive electrode and the negative electrode from one another and prevents short circuiting between the positive and negative electrodes.

Battery components including functional layers with the aim of improving heat resistance, strength, adhesiveness, and the like are conventionally used in secondary batteries such as lithium ion secondary batteries. Examples of such functional layer-equipped battery components include an electrode that includes an electrode substrate obtained by stacking an electrode mixed material layer on a current collector and a functional layer on the electrode mixed material layer of the electrode substrate, and a separator that includes a separator substrate made of a polyolefin or the like and a functional layer on the separator substrate.

Porous membranes formed from heat resistant resins such as aramid resins are conventionally used as such functional layers (for example, refer to Patent Literature (PTL) 1 to 3).

CITATION LIST

Patent Literature

PTL 1: JP 5072242 B
PTL 2: JP 2009-123483 A
PTL 3: JP 2009-123484 A

SUMMARY

Technical Problem

A functional layer formed from a heat resistant resin such as described above has excellent heat resistance, inhibits heat shrinkage of a battery component including the functional layer, and can contribute to improving battery safety. On the other hand, the water content of such a conventional functional layer tends to increase. This is presumed to be due to chloride ions that are imported into the functional layer by the heat resistant resin and/or other components (hereinafter, also referred to simply as a "heat resistant resin or the like") forming a metal chloride that then undergoes deliquescence. The use of a functional layer having high water content as described above leads to problems such as warping of a battery component including the functional layer and deterioration of battery characteristics of a secondary battery. Moreover, heat resistant resins such as aramid resins generally have poor thermoplasticity due to their heat resistance and do not readily display sufficient binding capacity. Therefore, functional layers formed from heat resistant resins also suffer from a problem that it is difficult to achieve strong adhesion between adjacent battery components using the functional layer.

Accordingly, an objective of the present disclosure is to provide a beneficial solution to the problems set forth above.

Solution to Problem

The inventor conducted diligent investigation with the aim of solving the problems set forth above. Through this investigation, the inventor discovered that through inclusion of an acidic group-containing polymer in a functional layer that contains a heat resistant resin and has a percentage content of chlorine atoms that is within a specific range, the functional layer can be provided with excellent heat resistance while also reducing water content of the functional layer and improving adhesiveness of the functional layer. In this manner, the inventor completed the present disclosure.

Specifically, the present disclosure aims to advantageously solve the problems set forth above by disclosing a functional layer for a non-aqueous secondary battery comprising a heat resistant resin and an acidic group-containing polymer, wherein percentage content of chlorine atoms as measured by combustion ion chromatography is not less than 0.001 mass % and not more than 2.000 mass %. When a functional layer contains a heat resistant resin and an acidic group-containing polymer and has a percentage content of chlorine atoms that is within the range set forth above in this manner, the functional layer has low water content and excellent heat resistance and adhesiveness.

The "percentage content of chlorine atoms" of a functional layer referred to in the present disclosure is a value measured by combustion ion chromatography and, more specifically, can be measured by a method described in the EXAMPLES section of the present specification.

In the presently disclosed functional layer for a non-aqueous secondary battery, the heat resistant resin is preferably an aramid resin. Sufficient heat resistance of the functional layer can be ensured by using an aramid resin as the heat resistant resin.

In the presently disclosed functional layer for a non-aqueous secondary battery, the acidic group-containing polymer preferably has an acidic group content of not less than 0.01 mmol/g and not more than 3.00 mmol/g. Water content of the functional layer can be further reduced by using a polymer having an acidic group content that is within the range set forth above.

The "acidic group content" of a polymer referred to in the present disclosure is a value measured by thermal decomposition gas chromatography and, more specifically, can be measured by a method described in the EXAMPLES section of the present specification.

The presently disclosed functional layer for a non-aqueous secondary battery preferably further comprises non-conductive particles. The inclusion of non-conductive particles in the functional layer can further increase heat resistance and improve strength of the functional layer and can ensure a high level of secondary battery safety.

Moreover, the present disclosure aims to advantageously solve the problems set forth above by disclosing a non-aqueous secondary battery comprising the functional layer for a non-aqueous secondary battery set forth above. When a secondary battery includes the functional layer set forth above, sufficient safety is ensured and battery characteristics of the secondary battery are excellent.

Advantageous Effect

According to the present disclosure, it is possible to provide a functional layer for a non-aqueous secondary battery that has reduced water content and excellent heat resistance and adhesiveness and a non-aqueous secondary battery that includes this functional layer for a non-aqueous secondary battery.

DETAILED DESCRIPTION

The following provides a detailed description of embodiments of the present disclosure.

The presently disclosed functional layer for a non-aqueous secondary battery may, for example, constitute part of an electrode or a separator, and preferably a separator. Moreover, the presently disclosed non-aqueous secondary battery includes at least the presently disclosed functional layer for a non-aqueous secondary battery.

(Functional Layer for Non-Aqueous Secondary Battery)

The presently disclosed functional layer contains a heat resistant resin and an acidic group-containing polymer, and may optionally further contain non-conductive particles and other components. The percentage content of chlorine atoms in the presently disclosed functional layer for a non-aqueous secondary battery as measured by combustion ion chromatography is not less than 0.001 mass % and not more than 2.000 mass %.

The presently disclosed functional layer has excellent heat resistance as a result of containing the heat resistant resin and can ensure sufficient safety of a secondary battery having a battery component that includes the presently disclosed functional layer.

In addition, as a result of containing the acidic group-containing polymer, the presently disclosed functional layer has excellent adhesiveness and has low water content despite the percentage content of chlorine atoms being within the range set forth above. The reason that the presently disclosed functional layer has excellent adhesiveness and also has low water content despite the percentage content of chlorine atoms being within the range set forth above is presumed to be due to the following contribution of the acidic group-containing polymer. Specifically, the acidic group-containing polymer firstly displays properties as a binder. This provides the presently disclosed functional layer with high adhesiveness compared to a functional layer formed from only a heat resistant resin. Also, the acidic group-containing polymer can capture metal ions such as lithium ions and calcium ions in a formation process of the functional layer, for example, through acidic groups thereof. By capturing these metal ions, the acidic group-containing polymer can reduce the amount of metal chloride (calcium chloride, lithium chloride, etc.) that is actually present in the functional layer and thereby suppress a rise in water content caused by deliquescence of the metal chloride. It is thought that through these properties of the acidic group-containing polymer, adhesiveness of the functional layer can be increased, and a functional layer having low water content can be obtained even when chloride ions are imported into the functional layer by the heat resistant resin or the like.

<Percentage Content of Chlorine Atoms>

The percentage content of chlorine atoms in the presently disclosed functional layer as measured by combustion ion chromatography is required to be not less than 0.001 mass % and not more than 2.000 mass %, and is preferably 1.500 mass % or less, more preferably 1.000 mass % or less, even more preferably 0.700 mass % or less, and particularly preferably 0.600 mass % or less. Chloride ions are, for example, mixed into the heat resistant resin or the like in a production process of the heat resistant resin or the like, and thus are imported into the functional layer when the heat resistant resin or the like is used in formation of the functional layer. As a result of the presently disclosed functional layer containing the acidic group-containing polymer, a rise in water content of the functional layer can be suppressed even when the percentage content of chlorine atoms is within any of the ranges set forth above.

However, a rise in water content of the functional layer cannot be sufficiently suppressed if the percentage content of chlorine atoms exceeds 2.000 mass %. Moreover, warping of a battery component that includes the functional layer cannot be inhibited and battery characteristics such as high-temperature storage characteristics deteriorate due to evolution of gas caused by water.

Although chloride ions act as a cause of increased functional layer water content, the importation of an appropriate amount of chloride ions into a secondary battery using a functional layer in which the percentage content of chlorine atoms is 0.001 mass % or more is beneficial in terms of forming an appropriate solid electrolyte interface (SEI) film at the surface of a negative electrode and improving battery characteristics such as high-temperature storage characteristics and charge/discharge cycle characteristics.

The percentage content of chlorine atoms in the functional layer can be reduced, for example, by performing washing with water or like of the functional layer obtained using the heat resistant resin or the like.

<Heat Resistant Resin>

The heat resistant resin may be a resin having a softening temperature and a decomposition temperature that are both 250° C. or higher. As a result of the functional layer containing the heat resistant resin, heat resistance of the functional layer can be increased, heat shrinkage of a battery component including the functional layer can be inhibited, and sufficient secondary battery safety can be ensured. Examples of such heat resistant resins include, but are not specifically limited to, aramid resins (aromatic polyamide resins) and crosslinked resins.

The aramid resin may, for example, be a para-aramid resin or a meta-aramid resin.

The crosslinked resin may, for example, be a resin formed from a polymer including a crosslinkable monomer unit in a proportion of not less than 50 mass % and not more than 100 mass %, and preferably not less than 75 mass % and not more than 100 mass % when the amount of all monomer units is taken to be 100 mass %.

The phrase "includes a monomer unit" as used in the present disclosure means that "a polymer obtained with the monomer includes a repeating unit derived from the monomer".

Examples of crosslinkable monomers that can form the crosslinkable monomer unit of the crosslinked resin include, but are not specifically limited to, monomers that can form a crosslinked structure. Examples of crosslinkable monomers that can be used typically include monomers that are thermally crosslinkable. More specific examples include crosslinkable monomers including a thermally crosslinkable group and one olefinic double bond per molecule; and crosslinkable monomers including two or more olefinic double bonds per molecule (however, the subsequently described aliphatic conjugated diene monomers are excluded).

Examples of thermally crosslinkable groups include an epoxy group, an N-methylolamide group, an oxetanyl group, an oxazoline group, and combinations thereof. Of these thermally crosslinkable groups, an epoxy group is preferable in terms of ease with which crosslinking and crosslink density can be adjusted.

Examples of crosslinkable monomers including an epoxy group as a thermally crosslinkable group and including an olefinic double bond include unsaturated glycidyl ethers such as vinyl glycidyl ether, allyl glycidyl ether, butenyl glycidyl ether, and o-allyl phenyl glycidyl ether; monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of crosslinkable monomers including an N-methylolamide group as a thermally crosslinkable group and including an olefinic double bond include methylol group-containing (meth)acrylamides such as N-methylol (meth)acrylamide.

Examples of crosslinkable monomers including an oxetanyl group as a thermally crosslinkable group and including an olefinic double bond include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth) acryloyloxymethyl)-4-trifluoromethyloxetane.

Examples of crosslinkable monomers including an oxazoline group as a thermally crosslinkable group and including an olefinic double bond include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of crosslinkable monomers including two or more olefinic double bonds per molecule include allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethylene glycol divinyl ether, hydroquinone diallyl ether, tetraallyloxyethane, trimethylolpropane-diallyl ether, an allyl or vinyl ether of a polyfunctional alcohol other than those listed above, triallylamine, methylene bisacrylamide, and divinyl benzene.

One of these crosslinkable monomers may be used individually, or two or more of these crosslinkable monomers may be used in combination. Of these crosslinkable monomers, ethylene dimethacrylate is preferable. In other words, the crosslinked resin is preferably a resin formed from a polymer including an ethylene dimethacrylate unit in a proportion of not less than 50 mass % and not more than 100 mass % when the amount of all monomer units is taken to be 100 mass %.

One heat resistant resin may be used individually, or two or more heat resistant resins may be used in combination. Of these heat resistant resins, an aramid resin is preferable, and a para-aramid resin is more preferable from a viewpoint of sufficiently improving heat resistance of the functional layer.

No specific limitations are placed on the method by which the heat resistant resin described above is produced. An aramid resin can be obtained by, for example, carrying out condensation polymerization of an aromatic diamine and an aromatic dicarboxylic acid chloride by a known method. Moreover, a crosslinked resin can be obtained by, for example, carrying out addition polymerization of a monomer composition containing the crosslinkable monomer described above by a known method.

<Acidic Group-Containing Polymer>

The acidic group-containing polymer is a component that inhibits deliquescence of metal chloride in the functional layer by capturing metal ions and that holds components contained in the functional layer so that these components do not detach from the functional layer while also enabling adhesion between battery components via the functional layer (i.e., can function as a binder).

The softening temperature of the acidic group-containing polymer is lower than 250° C.

Examples of the acidic group included in the polymer include, but are not specifically limited to, a carboxy group, a sulfo group, and a phosphate group. The polymer may include one of these types of acidic groups or may include two or more of these types of acidic groups. Of these acidic groups, a carboxy group is preferable from a viewpoint of further reducing water content of the functional layer while also further improving adhesiveness of the functional layer.

The acidic group content of the polymer is preferably 0.01 mmol/g or more, more preferably 0.10 mmol/g or more, and even more preferably 0.40 mmol/g or more, and is preferably 3.00 mmol/g or less, more preferably 2.00 mmol/g or less, and even more preferably 1.00 mmol/g or less. Water content of the functional layer can be further reduced when the acidic group content of the polymer is 0.01 mmol/g or more. On the other hand, it is possible to ensure that a certain amount of metal ions that are not captured by acidic groups are present in a composition for a functional layer used to form the functional layer when the acidic group content of the polymer is 3.00 mmol/g or less. These metal ions that are not captured are thought to contribute to improving solubility of the heat resistant resin in a solvent and ensuring viscosity stability of the composition for a functional layer. Moreover, when the acidic group content of the polymer is 3.00 mmol/g or less, flexibility of the functional layer can be ensured and adhesiveness of the functional layer can be further improved.

No specific limitations are placed on the method by which an acidic group is introduced into the polymer. For example, a polymer may be produced using a monomer that includes an acidic group such as described above (acidic group-containing monomer) so as to obtain a polymer including an acidic group-containing monomer unit or end modification of any polymer may be carried out to obtain a polymer including an acidic group such as described above at the end thereof. The former of these methods is preferable. In other words, the acidic group-containing polymer is preferably a polymer that includes an acidic group-containing monomer unit.

<<Chemical Composition>>

The polymer including an acidic group-containing monomer unit is not specifically limited but preferably includes a (meth)acrylic acid ester monomer unit and a crosslinkable monomer unit in addition to the acidic group-containing monomer unit. It should also be noted that the polymer may include other monomer units (i.e., monomer units other than the acidic group-containing monomer unit, the (meth)acrylic acid ester monomer unit, and the crosslinkable monomer unit).

In the present disclosure, "(meth)acryl" is used to indicate "acryl" and/or "methacryl".

[Acidic Group-Containing Monomer Unit]

Examples of acidic group-containing monomers that can form the acidic group-containing monomer unit include carboxy group-containing monomers, sulfo group-containing monomers, and phosphate group-containing monomers.

Examples of carboxy group-containing monomers include ethylenically unsaturated monocarboxylic acids, derivatives of ethylenically unsaturated monocarboxylic acids, ethylenically unsaturated dicarboxylic acids, acid anhydrides of ethylenically unsaturated dicarboxylic acids, and derivatives of these ethylenically unsaturated dicarboxylic acids and acid anhydrides.

Examples of ethylenically unsaturated monocarboxylic acids include acrylic acid, methacrylic acid, and crotonic acid. Examples of derivatives of ethylenically unsaturated monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids include maleic acid, fumaric acid, itaconic acid, and mesaconic acid. Examples of acid anhydrides of ethylenically unsaturated dicarboxylic acids include maleic anhydride, acrylic anhydride, methylmaleic anhydride, and dimethylmaleic anhydride. Examples of derivatives of ethylenically unsaturated dicarboxylic acids include methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, and fluoroalkyl maleate.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include vinylphosphonic acid, 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

One of these acidic group-containing monomers may be used individually, or two or more of these acidic group-containing monomers may be used in combination. Of these acidic group-containing monomers, carboxy group-containing monomers are preferable, and acrylic acid, methacrylic acid, and itaconic acid are more preferable from a viewpoint of further reducing water content of the functional layer while also further improving adhesiveness of the functional layer.

The proportion constituted by the acidic group-containing monomer unit in the polymer when the amount of all monomer units is taken to be 100 mass % is preferably 1 mass % or more, more preferably 2 mass % or more, and even more preferably 3 mass % or more, and is preferably 15 mass % or less, more preferably 10 mass % or less, and even more preferably 8 mass % or less. Water content of the functional layer can be further reduced when the acidic group-containing monomer unit is included in the polymer in a proportion of 1 mass % or more. On the other hand, it is possible to ensure that there is a certain amount of metal ions that are not captured by acidic groups in a composition for a functional layer used to form the functional layer when the acidic group-containing monomer unit is included in the polymer in a proportion of 15 mass % or less. It is presumed that these metal ions contribute to improving solubility of the heat resistant resin in a solvent and ensuring viscosity stability of the composition for a functional layer. Moreover, when the proportion in which the acidic group-containing monomer unit is included in the polymer is 15 mass % or less, flexibility of the functional layer can be ensured and adhesiveness of the functional layer can be further improved.

[(Meth)Acrylic Acid Ester Monomer Unit]

Examples of (meth)acrylic acid ester monomers that can form the (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One of these (meth)acrylic acid ester monomers may be used individually, or two or more of these (meth)acrylic acid ester monomers may be used in combination. Of these (meth)acrylic acid ester monomers, methyl methacrylate and n-butyl acrylate are preferable.

The proportion constituted by the (meth)acrylic acid ester monomer unit in the polymer when the amount of all monomer units is taken to be 100 mass % is preferably 20 mass % or more, more preferably 30 mass % or more, and even more preferably 40 mass % or more, and is preferably 95 mass % or less, more preferably 90 mass % or less, and even more preferably 85 mass % or less. When the proportion in which the (meth)acrylic acid ester monomer unit is included in the polymer is within any of the ranges set forth above, the glass-transition temperature and swelling in electrolyte solution of the polymer can be appropriately controlled, adhesiveness of the functional layer (particularly adhesiveness in electrolyte solution) can be further increased, and battery characteristics of a secondary battery can be improved.

[Crosslinkable Monomer Unit]

Examples of crosslinkable monomers that can form the crosslinkable monomer unit include the same as previously described in the "crosslinked resin" section. One of these crosslinkable monomers may be used individually, or two or more of these crosslinkable monomers may be used in combination. Of these crosslinkable monomers, allyl methacrylate and ethylene dimethacrylate are preferable, and allyl methacrylate is more preferable.

The proportion constituted by the crosslinkable monomer unit in the polymer when the amount of all monomer units is taken to be 100 mass % is preferably 0.01 mass % or more, more preferably 0.05 mass % or more, and even more preferably 0.1 mass % or more, and is preferably 4 mass % or less, more preferably 3 mass % or less, and even more preferably 2 mass % or less. When the proportion in which the crosslinkable monomer unit is included in the polymer is 0.01 mass % or more, the polymer can maintain a good particulate form, adhesiveness of the functional layer can be further increased, and battery characteristics of a secondary battery (particularly output characteristics) can be improved. On the other hand, when the proportion constituted by the crosslinkable monomer unit in the polymer is 4 mass % or less, sufficient adhesiveness of the functional layer can be ensured without loss of flexibility of the polymer.

[Other Monomer Units]

Examples of other monomer units of the polymer include, but are not specifically limited to, an aromatic monovinyl monomer unit and an aliphatic conjugated diene monomer unit.

Examples of aromatic monovinyl monomers that can form the aromatic monovinyl monomer unit include styrene, α-methylstyrene, p-tert-butoxystyrene, and vinyltoluene.

Examples of aliphatic conjugated diene monomers that can form the aliphatic conjugated diene monomer unit include 1,3-butadiene, 2-methyl-1,3-butadiene, 2,3-dimethyl-1,3-butadiene, 2-chloro-1,3-butadiene, substituted linear conjugated pentadienes, and substituted and branched conjugated hexadienes.

It is preferable that an aromatic monovinyl monomer unit is included in the polymer as another monomer unit.

The proportion constituted by the aromatic monovinyl monomer unit in the polymer when the amount of all monomer units is taken to be 100 mass % is preferably 5 mass % or more, more preferably 10 mass % or more, and even more preferably 15 mass % or more, and is preferably 30 mass % or less, more preferably 25 mass % or less, and even more preferably 20 mass % or less. When the proportion in which the aromatic monovinyl monomer unit is included in the polymer is within any of the ranges set forth above, the glass-transition temperature and swelling in electrolyte solution of the polymer can be appropriately controlled, adhesiveness of the functional layer (particularly adhesiveness in electrolyte solution) can be further increased, and battery characteristics of a secondary battery can be improved.

One of these other monomers such as aliphatic conjugated diene monomers that can form other monomer units of the polymer may be used individually, or two or more of these other monomers may be used in combination.

<<Structure>>

The structure of the acidic group-containing polymer is not specifically limited and may be that of a non-composite polymer formed substantially by a single polymer component or that of a composite polymer formed by a plurality of polymer components.

A particle composed of a composite polymer is a heterophase structure in which different polymer portions are present within the particle.

In this context, a heterophase structure refers to a single particle formed by two or more different polymers being physically or chemically bonded, and not to a particle having a monophase structure formed by a single polymer such as a block polymer. Specific examples of the heterophase structure include a core-shell structure including a core portion and a shell portion that at least partially covers an outer surface of the core portion; a side-by-side structure in which two or more polymers are adjacent to each other; a snowman structure in which a portion of the polymer at the center in a core-shell structure is exposed from the outer shell; and an octopus *ocellatus* structure in which a spherical polymer particle has a different type of polymer particle embedded in the surface thereof to yield an integrated structure.

Of these examples, a polymer having a core-shell structure is preferable as the polymer from a viewpoint of further improving adhesiveness of the functional layer (particularly adhesiveness in electrolyte solution). The following describes the polymer having a core-shell structure in detail.

[Polymer Having Core-Shell Structure]

In a case in which the polymer is a composite polymer having a core-shell structure, the polymer includes a core portion and a shell portion that at least partially covers an outer surface of the core portion. From a viewpoint of improving battery characteristics of a secondary battery (particularly output characteristics), it is preferable that in the polymer having a core-shell structure, the shell portion covers part of the outer surface of the core portion but does not cover the whole of the outer surface of the core portion.

The N-methyl-2-pyrrolidone (NMP) insoluble content of a polymer forming the core portion of the polymer (hereinafter, referred to as the "core polymer") is preferably 60 mass % or more, more preferably 70 mass % or more, even more preferably 80 mass % or more, and particularly preferably 85 mass % or more. When NMP insoluble content of the core polymer is 60 mass % or more, the polymer can maintain a good particulate form and adhesiveness of the functional layer (particularly adhesiveness in electrolyte solution) can be further increased. The upper limit for NMP insoluble content of the core polymer is 100 mass %.

The NMP insoluble content of the core polymer described above can be adjusted by, for example, altering the chemical composition or molecular weight of the core polymer. The core polymer preferably includes an acidic group-containing monomer unit, a (meth)acrylic acid ester monomer unit, and a crosslinkable monomer unit.

The NMP insoluble content of a polymer forming the shell portion of the polymer (hereinafter, referred to as the "shell polymer") is preferably 0.25 mass % or more, more preferably 0.5 mass % or more, even more preferably 1 mass % or more, and particularly preferably 10 mass % or more, and is preferably 85 mass % or less, more preferably 80 mass % or less, and even more preferably 75 mass % or less. When NMP insoluble content of the shell polymer is 0.25 mass % or more, excessive elution of the shell polymer into electrolyte solution can be inhibited and battery characteristics of a secondary battery (particularly output characteristics) can be ensured. On the other hand, when NMP insoluble content of the shell polymer is 85 mass % or less, the polymer can be favorably dispersed and adhesiveness of the functional layer can be further improved.

The NMP insoluble content of the shell polymer described above can be adjusted by, for example, altering the chemical composition or molecular weight of the shell polymer. The shell polymer preferably includes an aromatic monovinyl monomer unit and an acidic group-containing monomer unit.

In the polymer having a core-shell structure, the mass proportion (core/shell ratio) of the core portion among the total of the core portion and the shell portion is preferably 60 mass % or more, and more preferably 70 mass % or more, and is preferably 95 mass % or less, and more preferably 90 mass % or less. When the core/shell ratio is within any of the ranges set forth above, adhesiveness of the functional layer can be further increased and battery characteristics of a secondary battery can be improved.

<<Production Method>>

No specific limitations are placed on the method by which the acidic group-containing polymer is produced. For example, in a case in which the polymer is produced as a non-composite polymer, the mode of polymerization may be any of solution polymerization, suspension polymerization, bulk polymerization, emulsion polymerization, and the like. Moreover, the polymerization reaction may be addition polymerization such as ionic polymerization, radical polymerization, or living radical polymerization. The polymerization may be carried out with a commonly used emulsifier, dispersant, polymerization initiator, chain transfer agent, or the like, and the amount thereof may also be the same as commonly used.

Furthermore, in a case in which the polymer is produced as a polymer having a core-shell structure, for example, the polymer can be produced by using monomer for the core polymer and monomer for the shell polymer to perform stepwise polymerization in which the ratio of these monomers is changed over time. Specifically, the polymer having a core-shell structure can be produced by continuous, multi-step emulsion polymerization or multi-step suspension polymerization in which a polymer produced in a previous step is sequentially covered with a polymer produced in a later step.

The following describes one example of a case in which the polymer having the core-shell structure is obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide, or an azo compound such as 2,2'-azobis(2-methyl-N-(2-hydroxyethyl)-propionamide) or 2,2'-azobis(2-amidinopropane) hydrochloride may be used as a polymerization initiator.

The polymerization procedure involves initially mixing one or more monomers for forming the core portion and the emulsifier, and then performing emulsion polymerization as one batch to obtain a particulate polymer that forms the core portion. The polymer having a core-shell structure described above can then be obtained by performing polymerization of one or more monomers for forming the shell portion in the presence of the particulate polymer forming the core portion.

In this polymerization, it is preferable that the monomers for forming the shell polymer are supplied into the polymerization system continuously or divided into a plurality of portions from a viewpoint of partially covering the outer surface of the core portion with the shell portion. As a result of the monomers for forming the shell polymer being supplied into the polymerization system in portions or continuously, the polymer forming the shell portion can be formed as particles that bond to the core portion such as to form a shell portion that partially covers the core portion.

<<Content Ratio of Heat Resistant Resin and Acidic Group-Containing Polymer>>

No specific limitations are placed on the content ratio of the heat resistant resin and the acidic group-containing polymer in the functional layer. For example, when the total content of the heat resistant resin and the acidic group-containing polymer is taken to be 100 mass %, the content of the acidic group-containing polymer is preferably 10 mass % or more, more preferably 20 mass % or more, and even more preferably 30 mass % or more, and is preferably 60 mass % or less, more preferably 50 mass % or less, and even more preferably 40 mass % or less. When the content of the polymer among the total content of the heat resistant resin and the polymer is 10 mass % or more, adhesiveness of the functional layer can be further increased and water content of the functional layer can be further reduced. On the other hand, when the content of the polymer among the total content of the heat resistant resin and the polymer is 60 mass % or less, sufficient heat resistance of the functional layer can be ensured.

The heat resistant resin is preferably contained in a proportion of not less than 10 mass % and not more than 60 mass % when total solid content of the functional layer is taken to be 100 mass %.

Moreover, the polymer is preferably contained in a proportion of not less than 10 mass % and not more than 60 mass % when total solid content of the functional layer is taken to be 100 mass %.

<Non-Conductive Particles>

The non-conductive particles are a component that can improve heat resistance and strength of the functional layer. Known non-conductive particles that are used in secondary batteries may be used as the non-conductive particles without any specific limitations.

Specifically, although both inorganic fine particles and organic fine particles other than the previously described heat resistant resin and acidic group-containing polymer can both be used as the non-conductive particles, inorganic fine particles are normally used. The material of the non-conductive particles is preferably an electrochemically stable material that is present stably in the environment of use of a secondary battery. Examples of materials of the non-conductive particles that are preferable from the viewpoints set forth above include particles of oxides such as aluminum oxide (alumina), hydrous aluminum oxide (Boehmite), silicon oxide, magnesium oxide (magnesia), calcium oxide, titanium oxide (titania), $BaTiO_3$, ZrO, and alumina-silica composite oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary.

One of these types of non-conductive particles may be used individually, or two or more of these types of non-conductive particles may be used in combination.

Moreover, the non-conductive particles are preferably contained in a proportion of not less than 30 mass % and not more than 80 mass % when total solid content of the functional layer is taken to be 100 mass %.

<Other Components>

The presently disclosed functional layer may optionally contain other components besides the components described above. Commonly known components can be used as these other components without any specific limitations so long as they do not affect the battery reactions. One of such other components may be used individually, or two or more of such other components may be used in combination.

For example, a known binder other than the previously described acidic group-containing polymer may be used as another component.

<Formation method of functional layer>

No specific limitations are placed on the method by which the presently disclosed functional layer is formed. The presently disclosed functional layer can be formed, for example, using a composition for a functional layer that is obtained by dissolving and/or dispersing the previously described heat resistant resin, acidic group-containing polymer, and optionally used non-conductive particles and other components in a solvent. For example, the composition for a functional layer may be applied onto the surface of a suitable substrate to form an applied film and then the applied film that is formed may be dried to form the functional layer.

The solvent used in the composition for a functional layer is not specifically limited so long as the components described above can be dissolved or dispersed therein, and may be water or an organic solvent.

Examples of organic solvents that may be contained in the composition for a functional layer include alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide-based polar organic solvents such as N,N-dimethylformamide, N,N-dimethylacetamide (DMAc), and NMP; N,N-dimethyl sulfoxide; and aromatic hydrocarbons such as toluene, xylene, chlorobenzene, orthodichlorobenzene, and paradichlorobenzene.

The solvent of the composition for a functional layer may be one solvent used individually or two or more solvents used as a mixture.

<<Sub Strate>>

No limitations are placed on the substrate on which the composition for a functional layer is applied. For example, an applied film of the composition for a functional layer may be formed on the surface of a detachable substrate, the applied film may be dried to form a functional layer, and then the detachable substrate may be peeled from the functional layer. The functional layer that is peeled from the detachable substrate in this manner can be used as a free-standing film in formation of a battery component of a secondary battery. Specifically, the functional layer that is peeled from the detachable substrate may be stacked on a separator substrate to form a separator including the functional layer or may be stacked on an electrode substrate to form an electrode including the functional layer.

However, it is preferable that a separator substrate or an electrode substrate is used as the substrate from a viewpoint of raising battery component production efficiency because a step of peeling the functional layer can be omitted.

<<Separator Substrate>>

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, an aramid resin (aromatic polyamide resin), or the like (however, the presently disclosed functional layer containing the acidic group-containing polymer is excluded), and is preferably a microporous membrane or non-woven fabric made from polyethylene due to the excellent strength thereof.

<<Electrode Substrate>>

The electrode substrate (positive/negative electrode substrate) is not specifically limited and may, for example, be an electrode substrate obtained by forming an electrode mixed material layer on a current collector.

Note that the current collector, an electrode active material (positive/negative electrode active material) and an electrode mixed material layer binder (positive/negative electrode mixed material layer binder) in the electrode mixed material layer, and the method by which the electrode mixed material layer is formed on the current collector may be known examples thereof such as those described in JP 2013-145763 A, for example.

<<Formation of Functional Layer on Substrate>>

Examples of methods by which the functional layer may be formed on a substrate such as the separator substrate or the electrode substrate set forth above include:

(1) a method in which the composition for a functional layer is applied onto the surface of a separator substrate or electrode substrate (surface at the electrode mixed material layer side in the case of an electrode substrate; same applies below) and is then dried;

(2) a method in which a separator substrate or electrode substrate is immersed in the composition for a functional layer and is then dried; and (3) a method in which the composition for a functional layer is applied onto a detachable substrate and is dried to produce a functional layer that is then transferred onto the surface of a separator substrate or electrode substrate.

Of these methods, method (1) is particularly preferable since it allows simple control of the thickness of the functional layer. In more detail, method (1) includes a step of applying the composition for a functional layer onto a substrate to form an applied film (application step) and a step of drying the applied film on the substrate to form a functional layer (functional layer formation step). In method (1), a step of coagulating the heat resistant resin in the applied film (coagulation step) and a step of washing the applied film to reduce chloride ion content in the applied film (washing step) may optionally be implemented prior to the functional layer formation step.

[Application Step]

Examples of methods by which the composition for a functional layer can be applied onto the substrate in the application step include, but are not specifically limited to, doctor blading, reverse roll coating, direct roll coating, gravure coating, extrusion coating, and brush coating.

[Coagulation Step and Washing Step]

The coagulation step and/or the washing step may be implemented after the application step, but before the functional layer formation step. Although no specific limitations are placed on the method by which the heat resistant resin contained in the applied film on the substrate is coagulated in the coagulation step, coagulation of the heat resistant resin may be performed by immersing the substrate on which the applied film has been formed in known coagulation water, for example. Moreover, although no specific limitations are placed on the method by which the applied film on the substrate is washed in the washing step, the substrate may be further immersed in a water bath after the coagulation step, for example.

[Functional Layer Formation Step]

The method by which the composition for a functional layer on the substrate is dried in the functional layer formation step is not specifically limited and may be a commonly known method. Examples of drying methods that may be used include drying using warm air, hot air, or low-humidity air; drying in a vacuum; and drying through irradiation with infrared light, electron beams, or the like. Although no specific limitations are placed on the drying conditions, the drying temperature is preferably 50° C. to 150° C., and the drying time is preferably 5 minutes to 30 minutes.

<<Thickness of Functional Layer>>

The thickness of the functional layer formed as described above is preferably not less than 0.5 µm and not more than 5 µm. A functional layer thickness of 0.5 µm or more can increase heat resistance and strength of a battery component that is provided with the functional layer. Moreover, a functional layer thickness of 5 μm or less can improve secondary battery output characteristics.

(Battery Component Including Functional Layer)

A battery component (separator or electrode) including the presently disclosed functional layer may include elements other than the presently disclosed functional layer set forth above in addition to the separator substrate or electrode substrate and the presently disclosed functional layer so long as the effects disclosed herein are not significantly lost. No specific limitations are placed on these elements other than the presently disclosed functional layer so long as they do not correspond to the presently disclosed functional layer.

(Non-Aqueous Secondary Battery)

The presently disclosed secondary battery includes the presently disclosed functional layer set forth above. More specifically, the presently disclosed secondary battery includes a positive electrode, a negative electrode, a separator, and an electrolyte solution, wherein the functional layer set forth above is included by at least one battery component among the positive electrode, the negative electrode, and the separator. As a result of the presently disclosed non-aqueous secondary battery including the presently disclosed functional layer, sufficient secondary battery safety is ensured and the presently disclosed non-aqueous secondary battery can display excellent battery characteristics.

<Positive Electrode, Negative Electrode, and Separator>

At least one of the positive electrode, the negative electrode, and the separator used in the presently disclosed secondary battery includes the presently disclosed functional layer. Specifically, an electrode produced by forming an electrode mixed material layer on a current collector to form an electrode substrate and then providing the presently disclosed functional layer on the electrode substrate may be used as a positive electrode or negative electrode that includes a functional layer. Moreover, a separator produced by providing the presently disclosed functional layer on a separator substrate may be used as a separator that includes a functional layer. Examples of electrode substrates and separator substrates that can be used include the same examples as described in the "functional layer for non-aqueous secondary battery" section.

Moreover, in the case of a positive electrode, negative electrode, or separator that does not include a functional layer, an electrode composed of an electrode substrate such as previously described or a separator composed of a separator substrate such as previously described may be used without any specific limitations.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Examples of suitable organic solvents in the case of a lithium ion secondary battery include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferred for their high dielectric constant and broad stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed secondary battery set forth above can be produced by, for example, stacking the positive electrode and the negative electrode with the separator in-between, performing rolling, folding, or the like of the resultant laminate as necessary to place the laminate in a battery container, injecting the electrolyte solution into the battery container, and sealing the battery container. At least one component among the positive electrode, the negative electrode, and the separator is a functional layer-equipped component. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a monomer unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate the NMP insoluble content and acidic group content of a polymer, the percentage content of chlorine atoms and water content of a functional layer, the warping resistance of a functional layer-equipped separator, the adhesiveness between battery components via a functional layer, and a nail penetration test for a secondary battery. The results are shown in Table 1.

<NMP Insoluble Content of Polymer>

For each of a core polymer and a shell polymer in a polymer having a core-shell structure, a water dispersion of a polymer (core polymer or shell polymer) serving as a measurement sample was produced under the same polymerization conditions as the polymerization conditions of the core portion or shell portion using the monomers, various additives, and so forth used in formation of the core portion or shell portion. Solvent exchange of the produced water dispersion was performed with NMP to prepare a composition containing the polymer in a concentration of 8% in NMP as a measurement sample.

Dropwise addition of 25 g of the measurement sample to 1 L of methanol was performed to cause precipitation of the polymer. The precipitated polymer was vacuum dried for 24 hours in a 25° C. environment to obtain a dried polymer (mass: W1 g). The dried polymer was left for 72 hours in 60° C. NMP and was then filtered by a 200 mesh to separate insoluble components. The insoluble components were washed with methanol and were subsequently dried for 24 hours in a 25° C. environment to obtain dried insoluble components (mass: W2 g). The NMP insoluble content (=W2/W1×100 (mass %)) was calculated from W1 and W2.

<Acidic Group Content of Polymer>

The acidic group content of a polymer was quantified using a thermal decomposition gas chromatograph by using a standard sample to plot a calibration curve from the charging amount. The measurement sample was a dried polymer obtained by drying an obtained water dispersion of the polymer in a vacuum dryer for 5 hours at 120° C. The measurement was performed using a Curie Point Pyrolyzer JHP-3 (JAI): GC-14A (produced by Shimadzu Corporation) with an FFAP (length 30 m, internal diameter 0.53 mm, film thickness 1 μm) as a column. The decomposition temperature of the measurement sample was taken to be 590° C. and measurement was performed by heating from 50° C. to 220° C. at a rate of 15° C./min.

<Percentage Content of Chlorine Atoms in Functional Layer>

A functional layer was peeled from an obtained functional layer-equipped separator and then 5 mg of the functional layer was loaded into a 20 mL volumetric flask. Deionized water was added to make up the volume to 20 mL and then dispersing was performed for 10 minutes in an ultrasonic bath. Thereafter, approximately 5 mL was taken into a syringe from the volumetric flask, was passed through a cartridge (Toyopak IC-SP produced by Tosoh Corporation), and was introduced into an ion chromatograph. Note that measurement was performed using an anion exchange membrane column (TSKgel IC-Anion-PW produced by Tosoh Corporation) connected to an ion chromatoanalyzer (IC-100 model produced by Yokogawa Electric Corporation). Measurement was performed in 1.6 mL/min of 3 mM $NaHCO_3$/1.2 mM $Na_2CO_3$. Detection was performed by conductivity.

<Water Content of Functional Layer>

A functional layer was peeled from an obtained functional layer-equipped separator and then a specimen of 10 cm×10 cm was cut out from the functional layer. The specimen was left for 24 hours at a temperature of 25° C. and a humidity of 50%. Thereafter, a coulometric titration moisture meter was used to measure the water content of the specimen per unit mass (μg/g) by the Karl Fischer method (JIS K0068 (2001); moisture vaporization method; vaporization temperature: 150° C.).

<Warping Resistance of Functional Layer-Equipped Separator>

A 10 cm×10 cm specimen was cut out from an obtained functional layer-equipped separator. The specimen was left for 24 hours in an environment having a dew point of −60° C. The condition of the specimen was subsequently inspected and was evaluated by the following standard.

A: Specimen warping height of 0.5 cm or less
B: Specimen warping height of more than 0.5 cm and not more than 1.0 cm
C: Specimen warping height of more than 1.0 cm <Adhesiveness Between Battery Components Via Functional Layer>

The adhesiveness between battery components (negative electrode and separator) via a functional layer was evaluated by measuring the peel strength as described below.

Specifically, a produced functional layer-equipped separator and negative electrode were each cut out as 10 mm in width by 50 mm in length. Next, the cut-out functional layer-equipped separator and negative electrode were stacked such that the functional layer and the negative electrode faced one another and were then pressed for 1 minute by a flat plate press at a temperature of 90° C. and a load of 1 MPa to obtain a specimen in which the negative electrode and the separator were unified via the functional layer. The obtained specimen was placed with the negative electrode (current collector) side thereof facing downward and cellophane tape was attached to the surface of the current collector. The cellophane tape was tape prescribed by JIS Z1522 that had been affixed to a horizontal test stage. One end of the separator side of the specimen was pulled in a vertical direction at a speed of 50 mm/min to peel off the separator and the stress during this peeling was measured. This measurement was performed in the same manner three times and an average value of the measurement results was taken to be the peel strength. Adhesiveness was judged by the following standard. A larger value for the peel strength indicates better adhesiveness between battery components via the functional layer.

A: Peel strength of 10 N/m or more
B: Peel strength of not less than 1 N/m and less than 10 N/m
C: Peel strength of less than 1 N/m <Secondary Battery Nail Penetration Test>

A produced 800 mAh laminate lithium ion secondary battery was pressed for 2 minutes at 90° C. and 1 MPa. Thereafter, a central part of the laminate was pierced with a resin pin in a room temperature environment. The condition of the secondary battery was checked 1 minute later and was evaluated by the following standard. A better result for the nail penetration test indicates better functional layer heat resistance and better adhesiveness between battery components via the functional layer in electrolyte solution.

A: Drop in battery voltage and heat release not observed
B: Drop in battery voltage observed but no heat release
C: Drop in battery voltage and heat release observed Example 1

<Production of Acidic Group-Containing Polymer>

A 5 MPa pressure-resistant vessel equipped with a stirrer was charged with 40.4 parts of methyl methacrylate and 36 parts of n-butyl acrylate as (meth)acrylic acid ester monomers, 3.2 parts of methacrylic acid as an acidic group-containing monomer, 0.4 parts of allyl methacrylate as a crosslinkable monomer, 1 part of sodium dodecylbenzenesulfonate as an emulsifier, 150 parts of deionized water, and 0.5 parts of potassium persulfate as a polymerization initiator. These materials were sufficiently stirred and were then heated to 60° C. to initiate polymerization of a core polymer. Once the polymerization conversion rate reached 96%, heating was continued while adding 19.8 parts of styrene as an aromatic monovinyl monomer and 0.2 parts of methacrylic acid as an acidic group-containing monomer to initiate polymerization of a shell polymer. The polymerization reaction was subsequently terminated by cooling to yield a water dispersion of an acidic group-containing polymer (core-shell structure).

The obtained water dispersion was adjusted to a solid content concentration of 14% through addition of NMP and was subsequently heated and dehydrated under stirring to yield an NMP dispersion of the acidic group-containing polymer.

<Production of Para-Aramid Resin>

First, 272.7 g of calcium chloride was dissolved in 4,200 g of NMP and then 132.9 g of p-phenylenediamine was added and completely dissolved. Next, 243.3 g of terephthaloyl dichloride was slowly added to the resultant solution, polymerization was performed, and then dilution was performed with NMP to obtain an NMP solution of a para-aramid resin (concentration of para-aramid resin: 2.0%).

<Production of Composition for Functional Layer>

A mixture obtained by adding 67 parts (in terms of solid content) of alumina (produced by Sumitomo Chemical Co., Ltd.; product name: AKP3000) as non-conductive particles to 33 parts (in terms of solid content) of the NMP solution of the para-aramid resin obtained as described above and mixing these materials was treated three times using a nanomizer. After this treatment, 18 parts (in terms of solid content) of the NMP dispersion of the acidic group-containing polymer obtained as described above was added to the resultant dispersion liquid and was stirred therewith for 1 hour using a Three-One Motor. After this stirring, filtration was performed using a 200-mesh screen and defoaming was performed under reduced pressure to obtain a composition for a functional layer.

<Production of Functional Layer-Equipped Separator>

The composition for a functional layer obtained as described above was applied onto a separator substrate made of polyolefin so as to form an applied film at one side of the separator substrate. The separator substrate having the applied film at one side was immersed in coagulating water to coagulate the para-aramid resin in the applied film. Next, the separator substrate for which para-aramid resin coagulation had been performed was transported to a water bath and was washed with water. The separator substrate that had been washed with water was passed through a dryer to dry the separator substrate and thereby obtain a separator including a functional layer of 4 μm in thickness on the separator substrate.

<Production of Positive Electrode>

A mixed liquid adjusted to a total solid content concentration of 70% was obtained by mixing 94 parts of NMC (LiNi$_{0.8}$Co$_{0.1}$Mn$_{0.1}$O$_2$) as a positive electrode active material, 3 parts of acetylene black (produced by Denka Company Limited; product name: HS-100) as a conductive material, and 3 parts in terms of solid content of polyvinylidene fluoride (produced by Kureha Corporation; product name: #7208) as a positive electrode binder, and then adding N-methylpyrrolidone to the resultant mixture as a solvent. The mixed liquid was mixed using a planetary mixer. In this manner, a slurry composition for a positive electrode was obtained.

A comma coater was used to apply the obtained slurry composition for a positive electrode onto one side of aluminum foil (thickness: 20 μm) serving as a positive electrode current collector such that the film thickness after drying was approximately 150 μm. The aluminum foil onto which the slurry composition for a positive electrode had been applied was then conveyed inside a 60° C. oven for 2 minutes at a speed of 0.5 m/min to dry the slurry composition for a positive electrode. Thereafter, the aluminum foil onto which the slurry composition for a positive electrode had been applied was subjected to 2 minutes of heat treatment at a temperature of 120° C. In this manner, a positive electrode mixed material layer was formed at one side of the positive electrode current collector. Next, the same operation was performed with respect to the other side of the positive electrode current collector so as to obtain a positive electrode web including the positive electrode current collector and positive electrode mixed material layers provided at both sides of the current collector. The positive electrode web was rolled by roll pressing to obtain a positive electrode having a positive electrode mixed material layer of 80 μm in thickness at each side.

<Production of Negative Electrode>

After mixing 97 parts of artificial graphite (volume-average particle diameter: 15.6 μm) as a negative electrode active material and 1 part in terms of solid content of a 2% aqueous solution of carboxymethyl cellulose (produced by Nippon Paper Industries Co., Ltd.; product name: MAC350HC) as a thickener, deionized water was added to adjust the solid content concentration to 68%. Stirring was then performed for 60 minutes at a temperature of 25° C. to obtain a mixed liquid. Further deionized water was added to the mixed liquid to adjust the solid content concentration to 62% and then further stirring was performed for 15 minutes at a temperature of 25° C.

Next, 2 parts in terms of solid content of a water dispersion of a negative electrode binder (produced by ZEON Corporation; product name: BM-451B; solid content concentration: 40%) was added to the mixed liquid, deionized water was added to adjust the final solid content concentration to 52%, and stirring was continued for 10 minutes to obtain a polymer mixture. The polymer mixture was subjected to a defoaming process under reduced pressure to yield a slurry composition for a negative electrode.

A comma coater was used to apply the obtained slurry composition for a negative electrode onto one side of copper foil (thickness: 20 μm) serving as a negative electrode current collector such that the film thickness after drying was approximately 150 μm. The copper foil onto which the slurry composition for a negative electrode had been applied was then conveyed inside a 60° C. oven for 2 minutes at a speed of 0.5 m/min to dry the slurry composition for a negative electrode. Thereafter, the copper foil onto which the slurry composition for a negative electrode had been applied was subjected to 2 minutes of heat treatment at a temperature of 120° C. In this manner, a negative electrode mixed material layer was formed at one side of the negative electrode current collector. Next, the same operation was performed with respect to the other side of the negative electrode current collector so as to obtain a negative electrode web including the negative electrode current collector and negative electrode mixed material layers provided at both sides of the current collector. The negative electrode web was rolled by roll pressing to obtain a negative electrode having a negative electrode mixed material layer of 80 μm in thickness at each side.

<Production of Secondary Battery>

Ten positive electrodes of 4.9 cm×5.0 cm were cut out from the positive electrode obtained as described above. Moreover, 20 separators of 5.5 cm×5.5 cm were cut out from the functional layer-equipped separator obtained as described above. Furthermore, 11 negative electrodes of 5.0 cm×5.2 cm were cut out from the negative electrode obtained as described above.

These cut-out components were stacked to obtain a laminate having a "negative electrode/separator/positive electrode/separator/negative electrode/separator/positive electrode/ . . . /negative electrode" layer structure. Note that in this stacking, the surface at the functional layer side of the separator was positioned facing the negative electrode. The obtained laminate was pressed for 8 seconds under pressing conditions of a temperature of 70° C. and a pressure of 1.0 MPa.

The post-pressing laminate was enclosed in aluminum packaging serving as a case for a non-aqueous secondary battery. An electrolyte solution (electrolyte: $LiPF_6$ of 1 M in concentration; solvent: ethylene carbonate (EC)/diethyl carbonate (DEC)/vinylene carbonate (VC)=68.5/30/1.5 (volume ratio)) was then injected into a space formed by the aluminum packaging such that no air remained. The aluminum case was then sealed by heat sealing an opening of the aluminum packaging at 150° C. In this manner, a laminate lithium ion secondary battery having a capacity of 800 mAh was produced.

Examples 2 and 9

An acidic group-containing polymer, a para-aramid resin, a composition for a functional layer, a functional layer-equipped separator, a positive electrode, a negative electrode, and a secondary battery were produced in the same way as in Example 1 with the exception that the chemical composition of the core polymer was changed as shown in Table 1 in production of the acidic group-containing polymer. Evaluations were performed in the same way as in Example 1.

Examples 3 to 5

An acidic group-containing polymer, a para-aramid resin, a composition for a functional layer, a functional layer-equipped separator, a positive electrode, a negative electrode, and a secondary battery were produced in the same way as in Example 1 with the exception that the chemical compositions of the core polymer and the shell polymer were changed as shown in Table 1 in production of the acidic group-containing polymer. Evaluations were performed in the same way as in Example 1.

Example 6

An acidic group-containing polymer, a composition for a functional layer, a functional layer-equipped separator, a positive electrode, a negative electrode, and a secondary battery were produced in the same way as in Example 1 with the exception that a meta-aramid resin produced as described below was used instead of a para-aramid resin in production of the composition for a functional layer. Evaluations were performed in the same way as in Example 1.
<Production of Meta-Aramid Resin>
First, 272.7 g of calcium chloride was dissolved in 4,200 g of NMP and then 132.9 g of m-phenylenediamine was added and completely dissolved. Next, 243.3 g of isophtaloyl dichloride was slowly added to the resultant solution, polymerization was performed, and then dilution was performed with NMP to obtain an NMP solution of a meta-aramid resin (concentration of meta-aramid resin: 2.0%).

Example 7

A water dispersion of an acidic group-containing polymer (core-shell structure) was produced in the same way as in Example 1. In addition, a crosslinked resin and a composition for a functional layer were produced as described below.

A functional layer-equipped separator, a positive electrode, a negative electrode, and a secondary battery were then produced in the same way as in Example 1 with the exception that the obtained composition for a functional layer was used. Evaluations were performed in the same way as in Example 1. Note that chlorine atoms detected from the functional layer of Example 7 are presumed to originate from chlorine-containing impurities mixed into carboxymethyl cellulose.
<Production of Crosslinked Resin>
A 5 MPa pressure-resistant vessel equipped with a stirrer was charged with 84.85 parts of ethylene dimethacrylate as a crosslinkable monomer, 15 parts of n-butyl acrylate as a (meth)acrylic acid ester monomer, 0.15 parts of methacrylic acid as an acidic group-containing monomer, 1 part of sodium dodecylbenzenesulfonate as an emulsifier, 150 parts of deionized water, and 0.5 parts of potassium persulfate as a polymerization initiator. These materials were sufficiently stirred and were then heated to 60° C. to initiate polymerization of a polymer. The polymerization reaction was terminated by cooling at the point at which the polymerization conversion rate reached 96% to yield a water dispersion (solid content concentration: 38.4%) of a crosslinked resin.
<Production of Composition for Functional Layer>
A mixed liquid was prepared by adding and mixing 33 parts (in terms of solid content) of the water dispersion of the crosslinked resin obtained as described above, 5 parts (in terms of solid content) of 2% carboxymethyl cellulose aqueous solution, 67 parts (in terms of solid content) of alumina (produced by Sumitomo Chemical Co., Ltd.; product name: AKP3000) as non-conductive particles, and 18 parts (in terms of solid content) of the water dispersion of the acidic group-containing polymer. Deionized water was added to the mixed liquid to obtain a composition for a functional layer having a solid content concentration of 15%.

Example 8

An acidic group-containing polymer, a para-aramid resin, a composition for a functional layer, a functional layer-equipped separator, a positive electrode, a negative electrode, and a secondary battery were produced in the same way as in Example 1 with the exception that washing of the separator substrate with water was not performed after coagulation of the para-aramid resin in production of the functional layer-equipped separator. Evaluations were performed in the same way as in Example 1.

Example 10

An acidic group-containing polymer, a para-aramid resin, a composition for a functional layer, a functional layer-equipped separator, a positive electrode, a negative electrode, and a secondary battery were produced in the same way as in Example 1 with the exception that the chemical composition of the shell polymer was changed as shown in Table 1 in production of the acidic group-containing polymer. Evaluations were performed in the same way as in Example 1.

Example 11

An acidic group-containing polymer, a para-aramid resin, a composition for a functional layer, a functional layer-equipped separator, a positive electrode, a negative electrode, and a secondary battery were produced in the same way as in Example 1 with the exception that the chemical composition of the shell polymer was changed as shown in Table 1 and 0.06 parts of t-dodecyl mercaptan was added as a molecular weight modifier in production of the acidic group-containing polymer. Evaluations were performed in the same way as in Example 1.

Example 12

An acidic group-containing polymer, a para-aramid resin, a composition for a functional layer, a functional layer-equipped separator, a positive electrode, a negative electrode, and a secondary battery were produced in the same way as in Example 1 with the exception that the amount of the para-aramid resin was changed to 18 parts and the amount of the acidic group-containing polymer was changed to 33 parts in production of the composition for a functional layer. Evaluations were performed in the same way as in Example 1.

Example 13

A para-aramid resin, a composition for a functional layer, a functional layer-equipped separator, a positive electrode, a negative electrode, and a secondary battery were produced in the same way as in Example 1 with the exception that a polymer produced as described below was used as an acidic group-containing polymer in production of the composition for a functional layer. Evaluations were performed in the same way as in Example 1.

<Production of Acidic Group-Containing Polymer>

A reaction vessel equipped with a stirrer was charged with 70 parts of deionized water, 0.15 parts of sodium lauryl sulfate (produced by Kao Corporation; product name: EMAL 2F) as an emulsifier, and 0.5 parts of ammonium persulfate as a polymerization initiator. The gas phase of the reaction vessel was purged with nitrogen gas and the contents of the reaction vessel were heated to 60° C.

A monomer composition was obtained in a separate vessel by supplying 50 parts of deionized water, 0.5 parts of sodium dodecylbenzenesulfonate as an emulsifier, 50.5 parts of methyl methacrylate and 45 parts of n-butyl acrylate as (meth)acrylic acid ester monomers, 4 parts of methacrylic acid as an acidic group-containing monomer, and 0.5 parts of allyl methacrylate as a crosslinkable monomer into the vessel and mixing these materials. The monomer composition was continuously added to the reaction vessel over 4 hours to perform polymerization. The polymerization reaction was continued at a temperature of 60° C. during addition of the monomer composition. After this addition had ended, further stirring was performed for 3 hours at a temperature of 70° C. to complete the polymerization reaction and produce a water dispersion containing an acidic group-containing polymer (non-composite polymer).

The obtained water dispersion was adjusted to a solid content concentration of 14% through addition of NMP and was then heated and dehydrated under stirring to obtain an NMP dispersion of the acidic group-containing polymer.

Comparative Example 1

A para-aramid resin, a composition for a functional layer, a functional layer-equipped separator, a positive electrode, a negative electrode, and a secondary battery were produced in the same way as in Example 1 with the exception that an acidic group-containing polymer was not added in production of the composition for a functional layer. Evaluations were performed in the same way as in Example 1.

Comparative Example 2

An acidic group-containing polymer, a composition for a functional layer, a functional layer-equipped separator, a positive electrode, a negative electrode, and a secondary battery were produced in the same way as in Example 1 with the exception that a para-aramid resin was not added in production of the composition for a functional layer. Evaluations were performed in the same way as in Example 1.

Comparative Example 3

An acidic group-containing polymer, a para-aramid resin, a composition for a functional layer, a functional layer-equipped separator, a positive electrode, a negative electrode, and a secondary battery were produced in the same way as in Example 1 with the exception that the amount of calcium chloride used in production of the para-aramid resin was changed to 545.4 g and washing of the separator substrate with water was not performed after coagulation of the para-aramid resin. Evaluations were performed in the same way as in Example 1.

Comparative Example 4

A polymer that did not include an acidic group was produced by the same procedure as the production procedure of the acidic group-containing polymer in Example 1 with the exception that the chemical compositions of the core polymer and the shell polymer were changed as shown in Table 1.

In addition, a para-aramid resin, a composition for a functional layer, a functional layer-equipped separator, a positive electrode, a negative electrode, and a secondary battery were produced in the same way as in Example 1 with the exception that the polymer obtained as described above that did not include an acidic group was used instead of the acidic group-containing polymer in production of the composition for a functional layer. Evaluations were performed in the same way as in Example 1.

In Table 1, shown below:
"core-shell" indicates polymer having core-shell structure;
"non-composite" indicates non-composite polymer;
"MMA" indicates methyl methacrylate unit;
"BA" indicates n-butyl acrylate unit;
"MAA" indicates methacrylic acid unit;
"AA" indicates acrylic acid unit;
"VSA" indicates vinyl sulfonic acid unit;
"VPA" indicates vinylphosphonic acid unit;
"AMA" indicates allyl methacrylate unit;
"ST" indicates styrene unit;
"PARA" indicates para-aramid resin; and
"MARA" indicates meta-aramid resin.

TABLE 1

|  |  |  |  |  | Example 1 | Example 2 | Example 3 | Example 4 | Example 5 | Example 6 |
|---|---|---|---|---|---|---|---|---|---|---|
| Functional layer | Polymer |  | Structure |  | Core-shell | Core-shell | Core-shell | Core-shell | Core-shell | Core-shell |
|  |  | Acidic group |  | Type | Carboxy group | Carboxy group | Sulfo group | Phosphate group | Carboxy group | Carboxy group |
|  |  |  |  | Content [mmol/g] | 0.40 | 0.40 | 0.40 | 0.40 | 2.09 | 0.40 |
|  |  | Core portion | Chemical composition | (Meth)acrylic acid ester monomer unit Type | MMA | MMA | MMA | MMA | MMA | MMA |
|  |  |  |  | Content [mass %] | 40.4 | 40.96 | 39.12 | 39.12 | 27.6 | 40.4 |
|  |  |  |  | Type | BA | BA | BA | BA | BA | BA |
|  |  |  |  | Content [mass %] | 36 | 36 | 36 | 36 | 36 | 36 |
|  |  |  |  | Acidic group-containing monomer unit Type | MAA | AA | VSA | VPA | MAA | MAA |
|  |  |  |  | Content [mass %] | 3.2 | 2.64 | 4.48 | 4.48 | 16 | 3.2 |
|  |  |  |  | Crosslinkable monomer unit Type | AMA | AMA | AMA | AMA | AMA | AMA |
|  |  |  |  | Content [mass %] | 0.4 | 0.4 | 0.4 | 0.4 | 0.4 | 0.4 |
|  |  |  | NMP insoluble content [mass %] |  | 98 | 98 | 98 | 98 | 98 | 98 |
|  |  | Shell portion | Chemical composition | Aromatic monovinyl monomer unit Type | ST | ST | ST | ST | ST | ST |
|  |  |  |  | Content [mass %] | 19.8 | 19.8 | 19.98 | 19.98 | 18 | 19.8 |
|  |  |  |  | Acidic group-containing monomer unit Type | MAA | MAA | VSA | VPA | MAA | MAA |
|  |  |  |  | Content [mass %] | 0.2 | 0.2 | 0.02 | 0.02 | 2 | 0.2 |
|  |  |  |  | Crosslinkable monomer unit Type | — | — | — | — | — | — |
|  |  |  |  | Content [mass %] | — | — | — | — | — | — |
|  |  |  | NMP insoluble content [mass %] |  | 40 | 40 | 40 | 40 | 40 | 40 |
|  |  |  | Core/shell ratio [mass %] |  | 80 | 80 | 80 | 80 | 80 | 80 |
|  |  |  | Amount [parts by mass] |  | 18 | 18 | 18 | 18 | 18 | 18 |
|  | Heat resistant resin |  | Type |  | PARA | PARA | PARA | PARA | PARA | MARA |
|  |  |  | Amount [parts by mass] |  | 33 | 33 | 33 | 33 | 33 | 33 |
|  | Non-conductive particles |  | Type |  | Alumina | Alumina | Alumina | Alumina | Alumina | Alumina |
|  |  |  | Amount [parts by mass] |  | 67 | 67 | 67 | 67 | 67 | 67 |
|  | Proportion constituted by polymer among polymer and heat resistant resin [mass %] |  |  |  | 35 | 35 | 35 | 35 | 35 | 35 |
|  | Percentage content of chlorine atoms [mass %] |  |  |  | 0.071 | 0.071 | 0.071 | 0.071 | 0.071 | 0.071 |
| Evaluation | Water content [µg/g] |  |  |  | 1500 | 1400 | 1700 | 1700 | 1300 | 1400 |
|  | Warping resistance |  |  |  | A | A | B | B | A | A |
|  | Adhesiveness |  |  |  | A | A | B | B | B | A |
|  | Nail penetration test |  |  |  | A | A | A | A | B | B |

|  |  |  |  |  | Example 7 | Example 8 | Example 9 | Example 10 | Example 11 | Example 12 |
|---|---|---|---|---|---|---|---|---|---|---|
| Functional layer | Polymer |  | Structure |  | Core-shell | Core-shell | Core-shell | Core-shell | Core-shell | Core-shell |
|  |  | Acidic group |  | Type | Carboxy group | Carboxy group | Carboxy group | Carboxy group | Carboxy group | Carboxy group |
|  |  |  |  | Content [mmol/g] | 0.40 | 0.40 | 0.40 | 0.40 | 0.40 | 0.40 |
|  |  | Core portion | Chemical composition | (Meth)acrylic acid ester monomer unit Type | MMA | MMA | MMA | MMA | MMA | MMA |
|  |  |  |  | Content [mass %] | 40.4 | 40.4 | 40.72 | 40.4 | 40.4 | 40.4 |
|  |  |  |  | Type | BA | BA | BA | BA | BA | BA |
|  |  |  |  | Content [mass %] | 36 | 36 | 36 | 36 | 36 | 36 |
|  |  |  |  | Acidic group-containing monomer unit Type | MAA | MAA | MAA | MAA | MAA | MAA |
|  |  |  |  | Content [mass %] | 3.2 | 3.2 | 3.2 | 3.2 | 3.2 | 3.2 |
|  |  |  |  | Crosslinkable monomer unit Type | AMA | AMA | AMA | AMA | AMA | AMA |
|  |  |  |  | Content [mass %] | 0.4 | 0.4 | 0.08 | 0.4 | 0.4 | 0.4 |
|  |  |  | NMP insoluble content [mass %] |  | 98 | 98 | 81 | 98 | 98 | 98 |
|  |  | Shell portion | Chemical composition | Aromatic monovinyl monomer unit Type | ST | ST | ST | ST | ST | ST |
|  |  |  |  | Content [mass %] | 19.8 | 19.8 | 19.8 | 19.76 | 19.8 | 19.8 |
|  |  |  |  | Acidic group-containing monomer unit Type | MAA | MAA | MAA | MAA | MAA | MAA |
|  |  |  |  | Content [mass %] | 0.2 | 0.2 | 0.2 | 0.2 | 0.2 | 0.2 |
|  |  |  |  | Crosslinkable monomer unit Type | — | — | — | AMA | — | — |
|  |  |  |  | Content [mass %] | — | — | — | 0.04 | — | — |
|  |  |  | NMP insoluble content [mass %] |  | 40 | 40 | 40 | 80 | 10 | 40 |
|  |  |  | Core/shell ratio [mass %] |  | 80 | 80 | 80 | 80 | 80 | 80 |
|  |  |  | Amount [parts by mass] |  | 18 | 18 | 18 | 18 | 18 | 33 |

TABLE 1-continued

|  |  |  |  |  |  |  |  |  |  |
|---|---|---|---|---|---|---|---|---|---|
| | Heat resistant resin | Type | | Crosslinked resin | PARA | PARA | PARA | PARA | PARA |
| | | Amount [parts by mass] | | 33 | 33 | 33 | 33 | 33 | 18 |
| | Non-conductive particles | Type | | Alumina | Alumina | Alumina | Alumina | Alumina | Alumina |
| | | Amount [parts by mass] | | 67 | 67 | 67 | 67 | 67 | 67 |
| | | Proportion constituted by polymer among polymer and heat resistant resin [mass %] | | 35 | 35 | 35 | 35 | 35 | 65 |
| | | Percentage content of chlorine atoms [mass %] | | 0.071 | 0.700 | 0.071 | 0.071 | 0.071 | 0.040 |
| Evaluation | | Water content [µg/g] | | 1000 | 2000 | 1500 | 1500 | 1500 | 800 |
| | | Warping resistance | | A | B | A | A | A | A |
| | | Adhesiveness | | A | B | A | B | A | A |
| | | Nail penetration test | | B | B | B | A | A | B |

|  |  |  |  |  |  | Example 13 | Comparative Example 1 | Comparative Example 2 | Comparative Example 3 | Comparative Example 4 |
|---|---|---|---|---|---|---|---|---|---|---|
| Functional layer | Polymer | | Structure | | | Non-composite | — | Core-shell | Core-shell | Core-shell |
| | | Acidic group | Type | | | Carboxy group | — | Carboxy group | Carboxy group | — |
| | | | Content [mmol/g] | | | 0.46 | — | 0.40 | 0.40 | — |
| | | Core portion | Chemical composition | (Meth)acrylic acid ester monomer unit | Type | Chemical composition | — | MMA | MMA | MMA |
| | | | | | Content [mass %] | MMA: 50.5 | — | 40.4 | 40.4 | 43.6 |
| | | | | | Type | BA: 45 | — | BA | BA | BA |
| | | | | | Content [mass %] | MAA: 4 AMA: 0.5 | — | 36 | 36 | 36 |
| | | | | Acidic group-containing monomer unit | Type | | — | MAA | MAA | — |
| | | | | | Content [mass %] | | — | 3.2 | 3.2 | — |
| | | | | Crosslinkable monomer unit | Type | | — | AMA | AMA | AMA |
| | | | | | Content [mass %] | | — | 0.4 | 0.4 | 0.4 |
| | | | NMP insoluble content [mass %] | | | | — | 98 | 98 | 98 |
| | | Shell portion | Chemical composition | Aromatic monovinyl monomer unit | Type | | — | ST | ST | ST |
| | | | | | Content [mass %] | | — | 19.8 | 19.8 | 20 |
| | | | | Acidic group-containing monomer unit | Type | | — | MAA | MAA | — |
| | | | | | Content [mass %] | | — | 0.2 | 0.2 | — |
| | | | | Crosslinkable monomer unit | Type | | — | — | — | — |
| | | | | | Content [mass %] | | — | — | — | — |
| | | | NMP insoluble content [mass %] | | | | — | 40 | 40 | 40 |
| | | Core/shell ratio [mass %] | | | | — | — | 80 | 80 | 80 |
| | | Amount [parts by mass] | | | | 18 | — | 18 | 18 | 18 |
| | Heat resistant resin | Type | | | | PARA | PARA | — | PARA | PARA |
| | | Amount [parts by mass] | | | | 33 | 33 | — | 33 | 33 |
| | Non-conductive particles | Type | | | | Alumina | Alumina | Alumina | Alumina | Alumina |
| | | Amount [parts by mass] | | | | 67 | 67 | 67 | 67 | 67 |
| | | Proportion constituted by polymer among polymer and heat resistant resin [mass %] | | | | 35 | — | — | 35 | 35 |
| | | Percentage content of chlorine atoms [mass %] | | | | 0.060 | 0.071 | 0.000 | 2.500 | 0.071 |
| Evaluation | | Water content [µg/g] | | | | 1400 | 3000 | 1500 | 3000 | 3000 |
| | | Warping resistance | | | | A | C | B | C | C |
| | | Adhesiveness | | | | A | C | C | B | C |
| | | Nail penetration test | | | | B | B | C | C | C |

It can be seen from Table 1 that for the functional layers of Examples 1 to 13, which each contained a heat resistant resin and an acidic group-containing polymer and had a percentage content of chlorine atoms that was within the prescribed range, the functional layer had low water content and excellent adhesiveness and heat resistance, and warping of a separator including the functional layer could be sufficiently inhibited.

Moreover, it can be seen that for the functional layer of Comparative Example 1, which contained a heat resistant resin and had a percentage content of chlorine atoms that was within the prescribed range but did not contain an acidic group-containing polymer, water content of the functional layer increased, adhesiveness of the functional layer deteriorated, and warping of a separator including the functional layer could not be sufficiently inhibited.

Furthermore, it can be seen that sufficient heat resistance could not be ensured for the functional layer of Comparative Example 2, which contained an acidic group-containing polymer but did not contain a heat resistant resin, and thus had a percentage content of chlorine atoms of less than 0.001 mass %.

Also, for the functional layer of Comparative Example 3, which contained a heat resistant resin and an acidic group-containing polymer but had a percentage content of chlorine atoms exceeding 2.000 mass %, the excessive percentage content of chlorine atoms prevented sufficient reduction of water content even though the acidic group-containing polymer was included. Moreover, it was not possible to ensure sufficient heat resistance of the functional layer or sufficiently inhibit warping of a separator including the functional layer in Comparative Example 3.

Furthermore, it can be seen that for the functional layer of Comparative Example 4, which contained a heat resistant resin and had a percentage content of chlorine atoms that was within the prescribed range but also contained a polymer that did not have an acidic group, water content of the functional layer increased, adhesiveness and heat resistance of the functional layer deteriorated, and warping of a separator including the functional layer could not be sufficiently inhibited.

INDUSTRIAL APPLICABILITY

According to the present disclosure, it is possible to provide a functional layer for a non-aqueous secondary battery that has reduced water content and excellent heat resistance and adhesiveness and a non-aqueous secondary battery that includes this functional layer for a non-aqueous secondary battery.

The invention claimed is:

1. A functional layer for a non-aqueous secondary battery comprising a heat resistant resin and an acidic group-containing polymer, wherein
    percentage content of chlorine atoms as measured by combustion ion chromatography is not less than 0.001 mass % and not more than 2.000 mass %,
    the heat resistant resin is an aramid resin,
    the acidic group-containing polymer includes an acidic group-containing monomer unit, and
    the proportion constituted by the acidic group-containing monomer unit in the acidic group-containing polymer is 3.4 mass % or more and 15 mass % or less when the amount of all monomer units is taken to be 100 mass %.

2. The functional layer for a non-aqueous secondary battery according to claim 1, wherein the acidic group-containing polymer has an acidic group content of not less than 0.01 mmol/g and not more than 3.00 mmol/g.

3. The functional layer for a non-aqueous secondary battery according to claim 1, further comprising non-conductive particles.

4. A non-aqueous secondary battery comprising the functional layer for a non-aqueous secondary battery according to claim 3.

* * * * *